United States Patent [19]
Metcalf

[11] Patent Number: 5,273,803
[45] Date of Patent: Dec. 28, 1993

[54] APPARATUS AND METHOD FOR FABRICATING A SKELETON FRAMEWORK AND FINISHED PRODUCT DEFINING THREE-DIMENSIONAL CURVED SURFACE AND VOLUME

[76] Inventor: Michael Metcalf, 3702 Raymond St., Chevy Chase, Md. 20815

[21] Appl. No.: 946,212

[22] Filed: Sep. 17, 1992

[51] Int. Cl.$^5$ .......................... B21D 39/00; B32B 3/24
[52] U.S. Cl. ...................... 428/131; 428/139;
428/137; 428/140; 428/107; 428/156; 428/158;
428/159; 428/160; 428/166; 428/36.5;
428/34.1; 264/46.4; 264/46.7; 264/162;
264/219; 264/138; 264/139; 52/309.7;
52/309.17; 52/80.1; 52/80.2; 29/897.31;
29/433; 29/460
[58] Field of Search ............... 428/131, 139, 137, 140,
428/107, 156, 158, 159, 160, 166, 36.5, 34.1;
264/46.4, 46.7, 162, 219, 138, 139, 229.1;
29/897.31, 433, 460; 52/80.1, 80.2, 309.7,
309.17

[56] References Cited
U.S. PATENT DOCUMENTS

| | | | |
|---|---|---|---|
| 3,749,594 | 7/1973 | Bibb | 427/243 |
| 3,927,496 | 12/1975 | Kersavage | 52/80.2 |
| 4,196,542 | 4/1980 | West | 47/4 |
| 4,555,836 | 12/1985 | Martin | 29/460 |
| 4,618,924 | 10/1986 | Hinds | 364/191 |
| 4,863,663 | 9/1989 | Nico, Jr. et al. | 264/130 |
| 5,000,990 | 3/1991 | Freeman | 29/460 |
| 5,027,496 | 7/1991 | Zuccato | 29/460 |

Primary Examiner—Ellis P. Robinson
Assistant Examiner—William P. Watkins, III
Attorney, Agent, or Firm—John E. Benoit

[57] ABSTRACT

An apparatus and method for fabricating accurate, numerically defined curved surfaces and volumes comprising a skeleton framework having a plurality of bulkheads fixed in spaced relationship with each other, each of the bulkheads having an equal number of boreholes passing through the outer perimeter thereof so as to provide a set of selected boreholes. A flexible spline having a memory is passed through each set of mating boreholes and is secured with the boreholes after the splines have reached their static states. The resultant framework is encased in a cured polymer and the polymer is trimmed and faired between the outer edges of the splines.

15 Claims, 3 Drawing Sheets

APPARATUS AND METHOD FOR FABRICATING A SKELETON FRAMEWORK AND FINISHED PRODUCT DEFINING THREE-DIMENSIONAL CURVED SURFACE AND VOLUME

The present invention relates to three-dimensional model building and more particularly to models with compound curved surfaces where accurate curved surfaces are required.

BACKGROUND OF THE INVENTION

Currently there are a number of procedures used to produce three-dimensional models by automated machines and processes, as well as the traditional systems which are accomplished by hand. These procedures can be categorized generally into two types of processes: either additive or subtractive. That is, the model is either gradually formed by building on to it or is formed from a bulk material which is cut away.

Three-dimensional milling machines are available for making complex curved models; however, a three-dimensional computer-controlled machine can only make a model as large as its movement capacity. This places quite a limitation relative to the use of this type of equipment.

U.S. Pat. No. 4,863,663 issued Sep. 5, 1989, discloses a method of making a model prototype part using cardboard templates mounted on a base and covered with a glass fiber and bonded resin finish. As will be obvious, this is a very manual and time-consuming procedure.

Traditionally, when a designer designs a curved object on paper, he plots specific points and then uses a French curve or spline to fair the points into curved lines. Once the lines are faired, the designer can render the image to create the illusion of volume. The present invention uses this same principle in three dimensions. By plotting specific points on bulkheads held at specific orientation to one another, the three-dimensional equivalent of the drawing with specific points on it is created. If boreholes are then placed in each bulkhead at the points so located and a flexible spline having memory is threaded through all the holes, there is created a three-dimensional skeleton framework with latitudinal and longitudinal definitions resulting in the three-dimensional equivalent of a drawing created with French curves. If the spaces between the bulkheads and the splines are filled in and faired, the result is a three-dimensional equivalent of the rendered drawing.

It is a object of this invention to provide a relatively simple means for creating a skeleton framework from which a three-dimensional model may be produced.

It is a further objective of this invention that such three-dimensional skeleton framework can be used to ultimately form a plug from a workable polymer. This plug may then be used to form a casting so that the desired object may be mass-produced.

BRIEF SUMMARY OF THE INVENTION

An apparatus and method for fabricating curved surfaces and volumes is disclosed which comprises a skeleton framework having a plurality of bulkheads fixed in space relationship with each other, with each of the bulkheads having a number of boreholes passing through the outer perimeters thereof so as to provide a set of selected mating boreholes. Means may be provided for selectively adjusting the position of the boreholes. A flexible spline having a memory is passed through each set of mating boreholes and is secured within the boreholes after the splines have reached their static states. The resultant framework may then be encased in a cured polymer and the polymer is trimmed and faired between the outer edges of the splines so as to create a plug which may be used to create a mold.

DETAILED DESCRIPTION OF THE PREFERRED EMBODIMENTS

It is well known that a three-dimensional image can be designed using a computer-aided design (CAD). This image is represented by numeric coordinates which represent points on a series of planes connected by spin curves. By defining each of these planes as the area encompassed by the intersection point of each spline, a cross-section of the desired form is then represented. This cross-sectional plane is referred to hereinafter as a "bulkhead." By drilling an angled borehole at each spline intersection point on the bulkhead, a coordinate angle defined bulkhead is created. When a series of bulkheads at preselected angles and distances from each other are assembled in a fixed spaced relationship, the basic representative skeleton framework is created.

Each bulkhead can be precisely defined and fabricated by using existing (CAD/CAM) programs and technology. Additionally, each bulkhead can have its profile cut, reference holes drilled at specific locations, and specific boreholes drilled at the locations selected around the perimeter of the bulkhead.

Figure 1:
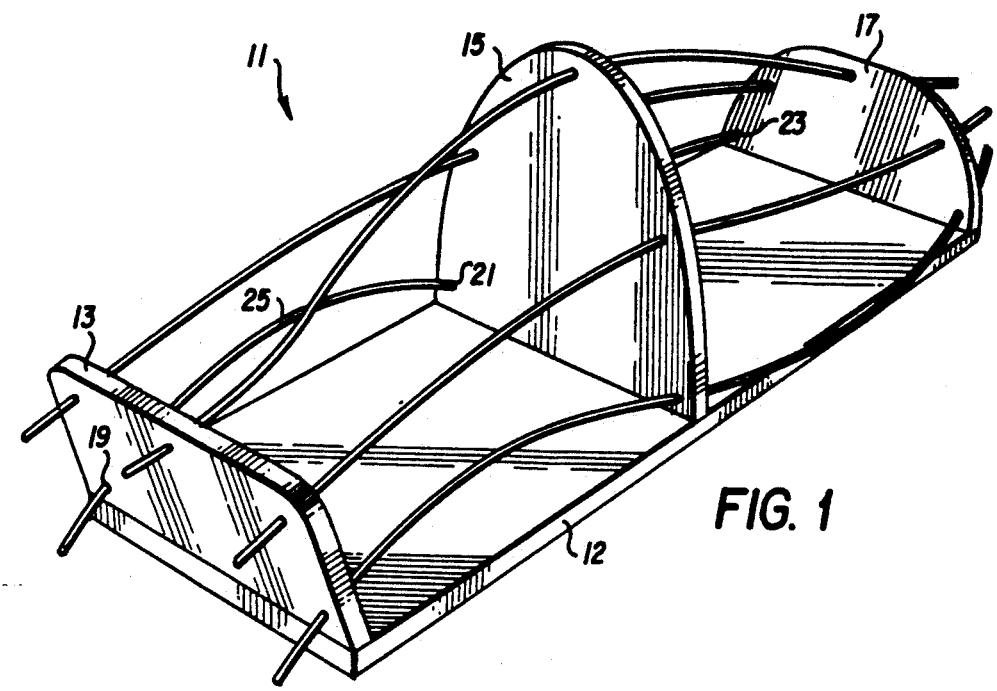
FIG. 1 is a schematic representation of the basic structure of the present invention.

FIG. 1 shows a schematic representation of a skeleton framework formed by bulkheads 13, 15, and 17. These bulkheads are shown as mounted at selected spaced intervals and at selected angles on a base 12. As previously discussed, boreholes have been drilled in each of the bulkheads at the desired points and angles. In the illustration of FIG. 1, each bulkhead has the same number of boreholes, with bulkhead 13 having five boreholes 19, bulkhead 15 having five boreholes 21, and bulkhead 17 having five boreholes 23. It should be noted that the number of boreholes does not have to be the same throughout a skeleton framework. With variations in size, additional boreholes may be added or removed as the bulkheads proceed from one end of the framework toward the opposite end. Splines 25 are shown passing through selected mating boreholes such as boreholes 19, 21 for particular spline 25. These splines are of a flexible material which has a memory. One such example would be a flexible cable which is available and which has the necessary memory. When the splines are located and passed through the appropriate boreholes, they will attain a static position having this desired configuration. These splines are then secured by any means such as glue or the like so that further movement is prevented. It should be noted that the splines used must be made of a stiff elastic material which bows uniformly when a moment is applied to each end and will straighten when the load is released. Thus, when it is bowed as shown in FIG. 1, it represents a specific three-dimensional arc. This results in a frame which is an accurate three-dimensional representation of the desired computer generated image. Effectively, these arcs are defined by the specific location of each borehole in each bulkhead, the distance and angles between bulkheads and the angle at which the three-dimensional arc and the bulkhead intersect.

Figure 2:
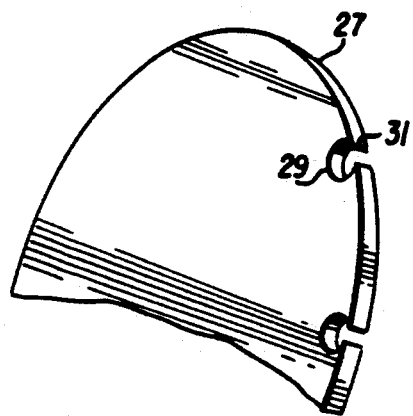
FIG. 2 is a partial view of one bulkhead which may be used in the structure of FIG. 1.

For reasons which will become apparent as the description proceeds, it is desirable that the splines be secured as close to the peripheral surfaces of the bulkheads as is mechanically feasible. One such method is shown in FIG. 2, wherein a bulkhead 27 has boreholes 29 which effectively leave a channel 31 across the perimeter of bulkhead 27. With this arrangement, the splines substantially terminate in their outer diameter at the outer perimeter of bulkhead 27 or the bulkhead extends only sightly above such perimeter.

Figure 3:
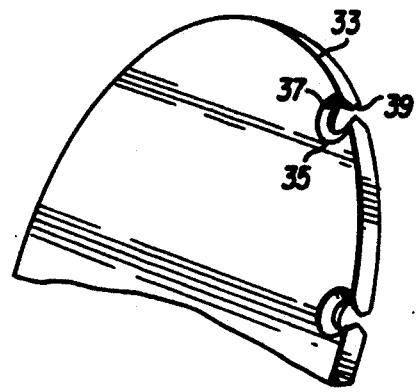
FIG. 3 is a further modification of a bulkhead which may be used in the structure of FIG. 1.

The angle of the holes, as described above, can be somewhat alleviated by making bulkheads such as 33 as shown in FIG. 3. In this particular case, boreholes 35 have beveled surfaces 37 and 39 on each side of the bulkhead. This bevelling permits the proper movement and location of the spline within the borehole so that it may assume an angle limited only by the inclination of the bevels.

Figure 4:
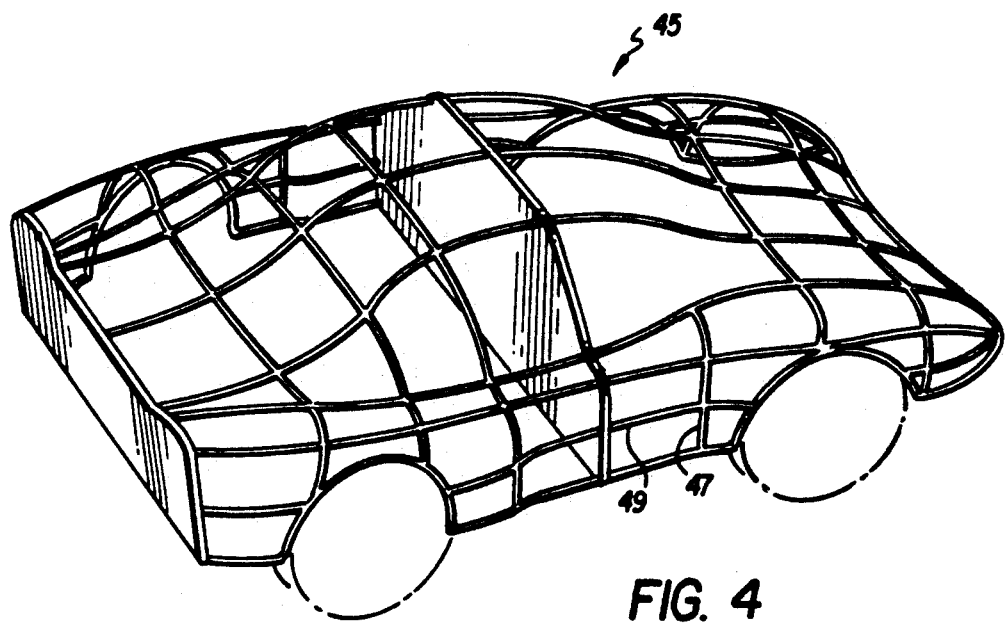
FIG. 4 is a schematic illustration of a finished skeleton framework showing a basic auto body design.
Figure 5:
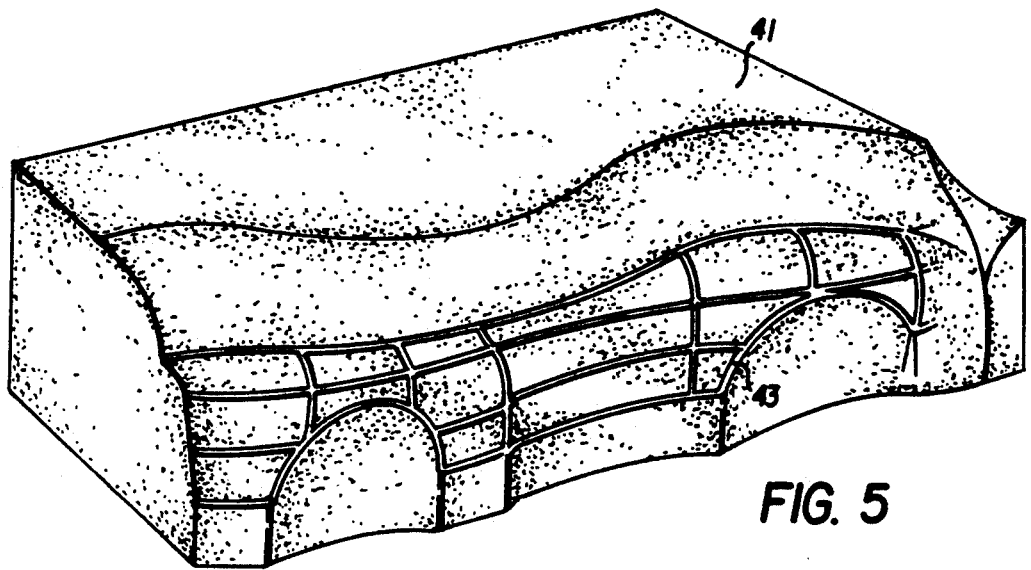
FIG. 5 is a schematic illustration of the skeleton framework of FIG. 4 within a cured polymer partially trimmed away.

The shape thus determined by the skeleton framework is an accurate three-dimensional frame prototype which may be used for many applications. Such a frame is shown in FIG. 4 as a basic car body design. If a complete surface is desired, this can be attained by placing the framework in a box, filling the box and the framework with a suitable polymer such as a suitable foam, i.e. liquid polyurethane, for example, which will expand and harden in several hours inside the box. Once the foam has been cured, it can be removed from the box and may subsequently be carved so as to cut the foam down to the area of the splines and bulkheads. FIG. 5 shows the framework of FIG. 4 within a bulk of foam 41 having been partially carved away as shown at 43. When all of the excess foam is removed, a complex surface results, providing a surface outline of the framework of FIG. 4. The foam may be removed through the use of a cutting tool such as a flexible hot wire. The complex surface has been developed by cutting down to the splines on the bulkheads with the surfaces in between being faired so as to provide a streamline configuration. The foam surface can then be hardened by covering the surface with a polymer, resulting in a complete prototype.

The final prototype with its finished surface can be used as a plug for making a die for production work, to aid in industrial design, or as part of a final product.

If the completed product requires complex elements which do not lend themselves to the present invention, other procedures can be utilized. In the case shown in FIG. 4, which is obviously a basic car body, a back end detail can be fabricated separately using existing techniques and can be incorporated with the rest of the model. It is quite obvious that the concept of the present invention can be expanded using more three-dimensional arcs or can be reduced using fewer arcs, as discussed above, depending upon the particular structure and ultimate design required.

Figure 6:
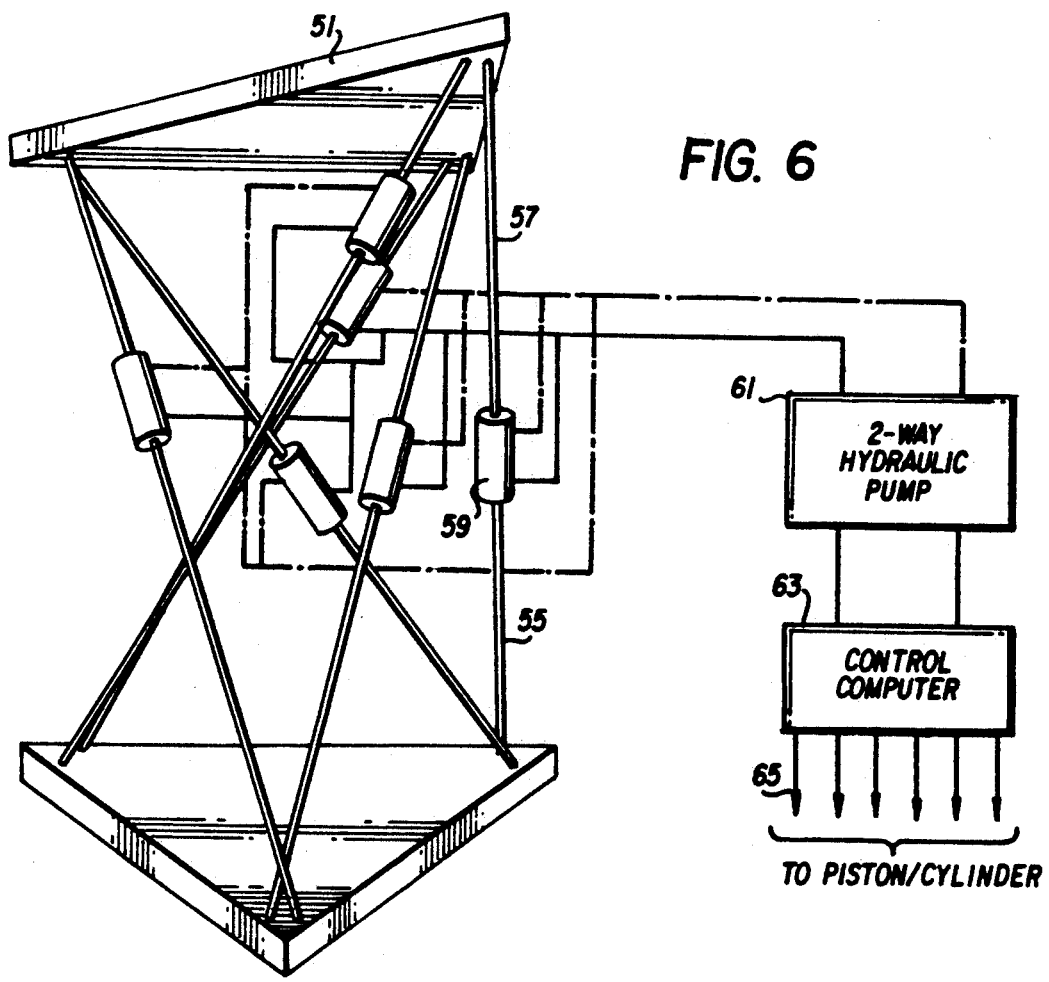
FIG. 6 is a schematic illustration of a system for adjusting the relationship between bulkheads.

FIG. 6 is a schematic representation of a means for adjusting the relative position of bulkheads illustrated as bulkheads 51 and 53 relative to each other. It is quite obvious that mechanically adjustable rods could be used in the manner as shown in FIG. 6, but this requires a great deal of measurement and time-consuming effort. The basic concept shown in the schematic of FIG. 6 is the use of a hydraulic system wherein a plurality of rods 55 and 57 extend within a piston cylinder 59 so that the lengths of the rods 55, 57 can be adjusted. Thus, the distance between the bulkheads as well as their angular relationship can be adjusted. The positioning is controlled through a linear actuator connected to a hydraulic pump 61, which in itself is controlled by computer 63 in a well known manner. The activation of individual piston cylinders is also controlled by computer 63, but is not shown beyond leads 65 in order to keep the drawings in a readable condition. Thus, this system can be used to automatically place the bulkheads in positions to match the coordinates of the design as discussed above.

Figure 7:
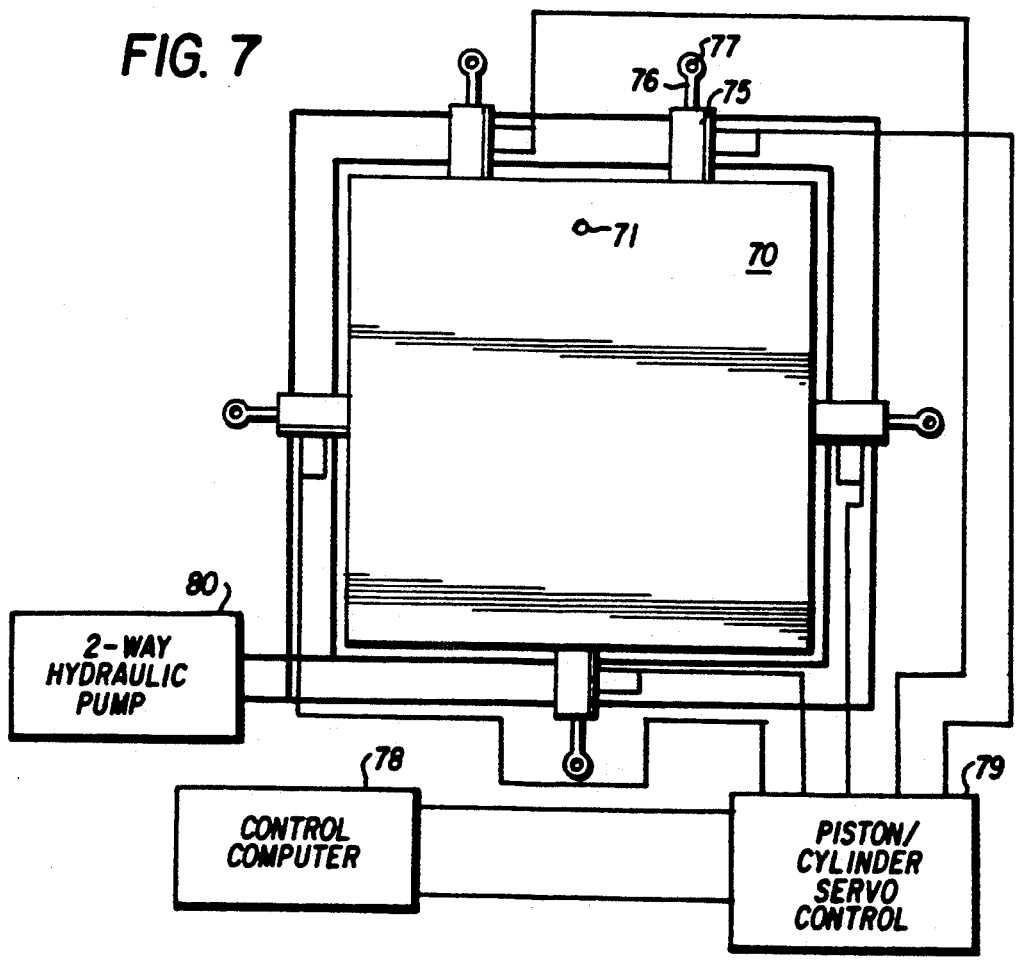
FIG. 7 is a further modification of a bulkhead which may be used in the structure of FIG. 1.

FIG. 7 is a schematic representation of a means for permitting the perimeter of the bulkhead to be adjusted or altered once a framework is assembled. In this illustration, the bulkhead consists of plate 70 and the various hydraulic piston/cylinders 75, piston arms 76, and boreholes 77. In this modification, reference holes 71 in plate 70 are used to orient the bulkhead to the frame (not shown). Control computer 78 sends output signals to hydraulic pump 80 and piston cylinder servo control 79. Each of the piston arms 76 individually extend or retract a set distance in accordance with the input from servo control 79. Accordingly, the perimeter of the bulkhead, as determined by the position of boreholes 77, would be altered in accordance with the output of control computer 78.

It should be noted that the number of cylinders 75 can vary and that all of the piston arms need not all lie in a plane, although a planar arrangement is desirable for most usages.

Although a hydraulic system is described in FIGS. 6 and 7, the invention is not to be limited thereto since other driving means could be used such as electric motors.

As a practical matter, the splines are terminated at one of the end bulkheads only and this allows them to slide through each of the boreholes as the bulkheads change their orientation to each other as the form is altered by the control of the computer through the hydraulic system.

As will now be obvious, the present invention provides a method and apparatus wherein a numerically defined image with compound curves can be redefined into an actual three-dimensional skeletal framework which can be adjusted to a desired shape by adjusting the relative position and angle of the bulkhead as well as altering their perimeters. This framework is used as a prototype to provide a designer an accurate three dimensional surface.

The above description and drawings are illustrative only since modifications of the various components could be made without departing from the invention, the scope of which is to be limited only by the following claims.

I claim:

1. A method for fabrication of a skeleton framework defining three-dimensional curved surfaces and volume comprising providing a series of bulkheads at spaced intervals;

defining a set of points substantially adjacent the perimeters of each of said bulkheads;

providing boreholes through said bulkheads at each of said points, each of said boreholes providing an open channel across the perimeters of said bulkheads;

passing a plurality of flexible splines having memory through substantially mating boreholes in adjacent bulkheads; and securing said splines within each of said boreholes after they have reached their static state.

2. The method of claim 1 wherein said bulkheads are of different sizes.

3. The method of claim 1 wherein said bulkhead perimeters have different geometrical configurations.

4. The method of claim 1 wherein said bulkheads lie in non-parallel planes relative to each other.

5. The method of claim 1 further comprising adjusting the angular orientation of said bulkheads relative to each other.

6. The method of claim 5 further comprising adjusting the distance between said bulkheads.

7. The method of claim 1 further comprising encasing said skeleton in a cured polymer; and trimming said polymer so that it conforms to the outer edges of said splines and is faired therebetween.

8. The method of claim 1 further comprising adjusting the position of said boreholes so as to alter the perimeter of said bulkhead.

9. A skeleton framework comprising a plurality of bulkheads;

means for mounting said bulkheads in a spaced relationship;

a plurality of boreholes passing through each of said bulkheads substantially adjacent the perimeters thereof, each of said boreholes providing an open channel across the perimeters of said bulkheads;

a plurality of flexible splines having a memory passing through substantially mating boreholes in adjacent bulkheads; and means for securing said flexible splines in said bulkheads.

10. The skeleton framework of claim 9 wherein the perimeters of said bulkheads have different geometrical configurations.

11. The skeleton framework of claim 9 wherein said boreholes pass through said bulkheads at angles to the plane of said bulkheads.

12. The skeleton framework of claim 9 wherein said bulkheads have two major surfaces and said boreholes intersect said two major surfaces to form edges, said edges being beveled.

13. The skeleton framework of claim 9 further comprising means for adjusting the angle of said bulkheads relative to each other.

14. The skeleton framework of claim 9 further comprising means for adjusting the distance between said bulkheads.

15. The skeleton framework of claim 9 further comprising means for adjusting the location of said boreholes so as to alter the perimeter of said bulkhead.

* * * * *